(12) United States Patent
Liang et al.

(10) Patent No.: US 8,514,933 B2
(45) Date of Patent: Aug. 20, 2013

(54) ADAPTIVE FRAME SKIPPING TECHNIQUES FOR RATE CONTROLLED VIDEO ENCODING

(75) Inventors: Yi Liang, San Diego, CA (US); Khaled Helmi El-Maleh, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1595 days.

(21) Appl. No.: 11/193,249

(22) Filed: Jul. 29, 2005

(65) Prior Publication Data

US 2006/0198443 A1 Sep. 7, 2006

Related U.S. Application Data

(60) Provisional application No. 60/657,956, filed on Mar. 1, 2005.

(51) Int. Cl.
*H04N 7/12* (2006.01)
(52) U.S. Cl.
USPC ............................... 375/240.03; 375/240.16
(58) Field of Classification Search
USPC .................. 375/240.03, 240.16; 382/236
See application file for complete search history.

(56) References Cited

U.S. PATENT DOCUMENTS

| | | | | |
|---|---|---|---|---|
| 6,657,637 | B1 * | 12/2003 | Inagaki et al. | 345/629 |
| 2002/0147834 | A1 | 10/2002 | Liou et al. | 709/236 |
| 2003/0063806 | A1 * | 4/2003 | Kim et al. | 382/236 |
| 2004/0076232 | A1 * | 4/2004 | Akiyama et al. | 375/240.08 |
| 2006/0062304 | A1 * | 3/2006 | Hsia | 375/240.16 |
| 2006/0133495 | A1 | 6/2006 | Ye et al. | |
| 2007/0230563 | A1 | 10/2007 | Tian et al. | |

FOREIGN PATENT DOCUMENTS

| | | |
|---|---|---|
| CN | 1497984 A | 5/2004 |
| JP | 5021494 | 6/2012 |
| JP | 5118127 | 10/2012 |
| JP | 5149265 | 12/2012 |
| WO | 0018134 | 3/2000 |
| WO | 0018134 A1 | 3/2000 |

OTHER PUBLICATIONS

Pan F., Lin Z. P., Lin X., Rahardja S., Juwono W., Slamer F.: "Content Adaptive Frame Skipping for Low Bit Rate Video Coding", Information, Communications and Signal Processing, IEEE, vol. 1, Dec. 15, 2003, pp. 230-234.*

(Continued)

*Primary Examiner* — Sath V Perungavoor
*Assistant Examiner* — James Pontius
(74) *Attorney, Agent, or Firm* — Kevin T. Cheatham

(57) ABSTRACT

The disclosure is directed to adaptive frame skipping techniques for rate controlled video encoding of a video sequence. According to the disclosed techniques, an encoder performs frame skipping in an intelligent manner that can improve video quality of the encoded sequence relative to encoding using conventional frame skipping. In particular, the disclosed frame skipping scheme is adaptive and considers motion activity of the video frames in order to identify certain frames that can be skipped without sacrificing significant video quality. The described frame skipping techniques may take into account the tradeoff between spatial and temporal quality of different video frames. In this manner, the techniques can allocate limited resources between the spatial and temporal quality in a way that can improve the visual appearance of a video sequence.

26 Claims, 7 Drawing Sheets

(56) References Cited

OTHER PUBLICATIONS

Fung Kai-Tat, et al: "New Architecture for Dynamic Frame-Skipping Transcoder" IEEEtrans Image Process; IEEE Transactions on Image Processing Aug. 2002, vol. 11, No. 8, Aug. 2002, pp. 886-900.

Tien-Ying Kuo et al: "Motion-Compensated Frame Interpolation Scheme for H.263 Codec" Circuits and Systems, 1999. ISCAS '99. Proceeding of the 1999 IEEE International Symposium on Orlando, FL, USA May 30-Jun. 2, 1999, Piscataway, NJ, USA, IEEE, US, vol. 4, May 30, 1999, pp. 491-494.

Pan F et al: "Content Adaptive Frame Skipping for Low Bit Rate Video Coding" Information, Communications and Signal Processing, 2003 and Fourth Pacific Rim Conference on Multimedia. Proceedings of the 2003 Joint Conference on Singapore Dec. 15-18, 2003, Piscataway, NJ USA, IEEE, vol. 1, Dec. 15, 2003, pp. 230-234.

Kuo, Tien-Ying, et al. "Motion-Compensated Frame Interpolation Scheme for H.263 Codec". Integrated Media Systems Center and Department of Electrical Engineering Systems, USC. IEEE 1999. pp. 491-494.

Fung, Kai-Tat, et al. "New Architecture for Dynamic Frame-Skipping Transcoder". IEEE Transactions on Image Processing, vol. 11, No. 8. Aug. 2002. pp. 886-898.

Pan, Feng, et al. "Content Adaptive Frame Skipping for Lo Bit Rate Video Coding". IEEE Dec. 2003. pp. 230-234.

International Search Report and Written Opinion—PCT/US2006/007223, International Search Authority—European Patent Office—Jul. 17, 2006.

Sei Naito et al., "Optimization of MPEG-2 Bit Assignment Scheme with Full Use of Distortion Minimization Oriented Rate Control Technology," Journal of the Institute of Electronics, Information and Communication Engineers, Nov. 1, 2003, vol. J86-D-II, No. 11, pp. 1565-1574.

Yoshinori Suzuki, "Recent Trend of MPEG-4 Visual," Report of the Information Processing Society of Japan, vol. 2004, No. 25 (2004-AVM-44), Mar. 5, 2004, pp. 85-90.

Taiwan Search Report—TW095106900—TIPO—Jul. 18, 2012.

\* cited by examiner

ADAPTIVE FRAME SKIPPING TECHNIQUES FOR RATE CONTROLLED VIDEO ENCODING

CROSS-REFERENCE TO RELATED CASES

This application claims the benefit of U.S. Provisional application No. 60/657,956 filed on Mar. 1, 2005, the entire content of which is incorporated herein by reference.

TECHNICAL FIELD

The disclosure relates to video encoding and, more particularly, frame skipping techniques used in video encoding.

BACKGROUND

A number of different video encoding standards have been established for encoding digital video sequences. The Moving Picture Experts Group (MPEG), for example, has developed a number of standards including MPEG-1, MPEG-2 and MPEG-4. Other examples include the International Telecommunication Union (ITU) H.263 standard, and the emerging ITU H.264 standard. These video encoding standards generally support improved transmission efficiency of video sequences by encoding data in a compressed manner. Compression reduces the overall amount of data that needs to be transmitted for effective transmission of video frames.

The MPEG-4, ITU H.263 and ITU H.264 standards, for example, support video encoding techniques that utilize similarities between successive video frames, referred to as temporal or inter-frame correlation, to provide inter-frame compression. The inter-frame compression techniques exploit data redundancy across frames by converting pixel-based representations of video frames to motion representations. Processes referred to as motion estimation and motion compensation are commonly performed in order to convert pixel-based representations of video frames to motion representations and thereby achieve inter-frame compression.

A number of rate control techniques have been developed for video encoding. Rate control techniques are useful to facilitate real-time transmission of video sequences, particularly when computing power is limited. For example, one way to achieve rate controlled encoding is to allow for adjustment of a quantization parameter (QP) during the video encoding process. The QP defines the level of quantization that occurs during video encoding, and directly impacts the number of bits used in the encoding. One variation on QP-based rate control is referred to as $\rho$-domain rate control. The parameter $\rho$ is used to represent the number of non-zero coefficients of video blocks of a video frame after quantization. The $\rho$ values can be mapped to QP values that yield the different values of $\rho$ in order to achieve p-domain rate control using selected QPs.

In either case, the dynamic selection of the QP can be used to control the number of bits that are encoded per second. As the QP increases, less data is preserved and the quality of the video encoding may degrade. As the QP decreases, more data is preserved and the quality of the video encoding improves. Unfortunately, selection of the QP for rate control is not always sufficient to meet limited bandwidth requirements. Therefore, some video applications, such as video telephony or video streaming, may further reduce the bit rate using frame skipping techniques. For frame skipping techniques, one or more video frames can be skipped altogether in the video encoding in order to ensure that bandwidth requirements are met. In particular, the bits that would have been allocated to a skipped frame are conserved for application to other frames within a video sequence. Conventional frame skipping typically occurs on a fixed basis, or occurs as needed, to ensure that bandwidth requirements are met.

SUMMARY

The disclosure is directed to adaptive frame skipping techniques for rate controlled video encoding of a video sequence. According to the disclosed techniques, an encoder performs frame skipping in an intelligent manner that can improve video quality of the encoded sequence relative to encoding using conventional frame skipping. In particular, the disclosed frame skipping scheme is adaptive and considers motion activity of the video frames in order to identify certain frames that can be skipped without sacrificing significant video quality.

The described frame skipping techniques may take into account the tradeoff between spatial and temporal quality of different video frames. In this manner, the techniques can allocate limited bandwidth between spatial and temporal quality in a way that can improve the visual appearance of a video sequence. Human vision is more sensitive to temporal quality when motion is high, but more sensitive to spatial quality when motion is low. According to this disclosure, frames may be ranked based on motion activity and individually analyzed based on spatial quality in order to identify the frames that can be skipped without sacrificing significant video quality.

In one embodiment, this disclosure describes a video encoding method comprising identifying one or more candidate video frames of a video sequence for frame skipping based at least in part on motion information associated with the video frames of the video sequence, and skipping the one or more candidate video frames during encoding of the video sequence.

In another embodiment, this disclosure describes a video encoding device comprising an encoder that encodes frames of a video sequence, and a rate control unit that identifies one or more candidate video frames of the video sequence for frame skipping based at least in part on motion information associated with the video frames of the video sequence, and causes the encoder to skip the one or more candidate video frames during encoding of the video sequence.

The techniques described herein may be implemented in a video encoding device in hardware, software, firmware, or any combination thereof. If implemented in software, the software may be executed in a programmable processor, such as a digital signal processor (DSP). In that case, the software that executes the techniques may be initially stored in a computer readable medium and loaded and executed in the programmable processor for effective rate controlled encoding in a digital video device. Thus, this disclosure also contemplates a computer readable medium comprising executable instruction that upon execution in a video encoding device cause the device to identify one or more candidate video frames of a video sequence for frame skipping based at least in part on motion information associated with the video frames of the video sequence, and skip the one or more candidate video frames during encoding of the video sequence.

Additional details of various embodiments are set forth in the accompanying drawings and the description below. Other features, objects and advantages will become apparent from the description and drawings, and from the claims.

DETAILED DESCRIPTION

Figure 1:
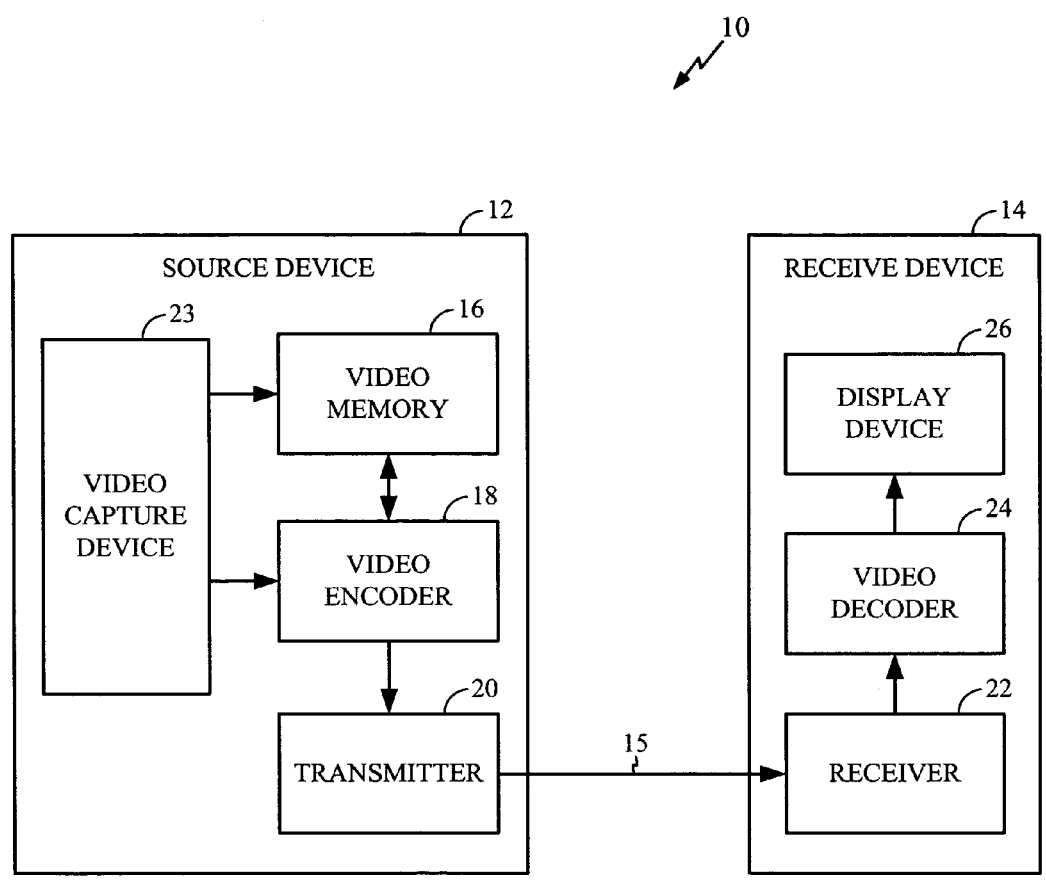
FIG. 1 is a block diagram illustrating an exemplary system in which a source digital video device transmits an encoded sequence of video data to a receive digital video device.

The disclosure is directed to frame skipping techniques for rate controlled video encoding of a video sequence. The disclosed frame skipping schemes are adaptive, and consider motion activity of the video frames in order to identify certain frames that can be skipped without sacrificing significant video quality. For example, motion information associated with video frames may be used to rank the frames in order to identify one or more candidate video frames that can be skipped without sacrificing significant video quality. The frame skipping techniques may be used in conjunction with a rate control technique in which the quantization parameter (QP) is selected in a dynamic fashion, but could also be used alone, without such rate control.

In one example, the motion information used to rank a candidate video frame comprises an average of the motion vector lengths of video blocks of the candidate video frame. In another example, the motion information associated with a candidate video frame comprises an average of the motion vector lengths of video blocks in a frame that precedes the candidate video frame in the video sequence. If the motion vector lengths of preceding frames are used to define the motion information associated with a candidate video block, the information is an approximation of motion, but is available without requiring an additional motion estimation loop in the encoding scheme. The video blocks may also be referred to herein as macroblocks (MBs), but are not necessarily limited to any particular size or format.

The techniques may involve ranking the video frames of the video sequence based at least in part on average motion vector lengths of macroblocks of the video frames (i.e., those of the current candidate or those of a previous frame), and identifying a threshold for each of the video frames based on spatial quality, as defined by quantization parameters (QPs) associated with the video frames. The threshold may be different for different video frames insofar as the QPs are different. In this manner, video frames encoded with lower QPs, which have higher spatial resolution, can be given precedence over frames that have higher QPs and hence poorer spatial resolution. By using both a ranking based on motion, and a threshold defined as a function of spatial resolution, the techniques can balance spatial and temporal quality of different video frames in order to identify good candidates for skipping. Many other conditions may also be applied to the frame skipping scheme, for example, to prevent frame skipping when bandwidth is abundant or to prevent skipping when motion is extremely high.

The techniques can allocate limited resources based on the spatial and temporal quality of different video frames in a manner that can improve the visual appearance of a video sequence. Human vision is more sensitive to temporal quality when motion is high. When motion is low, however, human vision is more sensitive to spatial quality. According to this disclosure, frames can be ranked based on motion activity, and assessed based on spatial quality in order to identify the frames that can be skipped without sacrificing significant video quality.

FIG. 1 is a block diagram illustrating an example system 10 in which a source device 12 transmits an encoded sequence of video data to a receive device 14 via a communication link 15. Source device 12 encodes video data consistent with a video standard such as the MPEG-4 standard, the ITU H.263 standard, the ITU H.264 standard, or any of a wide variety of other standards that can make use of rate controlled video encoding. One or both of devices 12, 14 of system 10 implement rate control techniques using adaptive frame skipping, as described in greater detail below, in order to improve the video encoding process. Such rate control techniques using adaptive frame skipping are particularly useful for real-time transmission of video sequences, such as in video telephony or video streaming applications, over a limited bandwidth communication link 15. The rate control techniques may be especially desirable in mobile video telephony or mobile video streaming applications, e.g., over a wireless communication link.

In general, communication link 15 may comprise a wireless link, a physical transmission line, optical fiber, a packet based network such as a local area network, wide-area network, or global network such as the Internet, a public switched telephone network (PSTN), or any other communication link capable of transferring data. Thus, communication link 15 represents any suitable communication medium, or possibly a collection of different networks and links, for transmitting video data from source device 12 to receive device 14. As mentioned, however, communication link 15 may have limited bandwidth, making rate control very desirable for real-time transmission of video sequences over link 15. The limited bandwidth may be due to physical constraints on communication link 15, or possibly quality-of-service (QoS) limitations or bandwidth allocation constraints imposed by the provider of communication link 15.

Source device 12 may comprise any digital video device capable of encoding and transmitting video data. Source device 12 may include a video memory 16 to store digital video sequences, a video encoder 18 to encode the sequences, and a transmitter 20 to transmit the encoded sequences over communication link 15 to source device 14. Video encoder 18 may include, for example, various hardware, software or firmware, or one or more digital signal processors (DSP) that execute programmable software modules to control the video encoding techniques, as described herein. Associated memory and logic circuitry may be provided to support the DSP in controlling the video encoding techniques.

Source device 12 may also include a video capture device 23, such as a video camera, to capture video sequences and store the captured sequences in memory 16. In particular, video capture device 23 may include a charge coupled device (CCD), a charge injection device, an array of photodiodes, a complementary metal oxide semiconductor (CMOS) device, or any other photosensitive device capable of capturing video images or digital video sequences.

As further examples, video capture device 23 may comprise a video converter that converts analog video data to digital video data, e.g., from a television, video cassette recorder, camcorder, or another video device. In some embodiments, source device 12 may be configured to transmit real-time video sequences over communication link 15. In that case, receive device 14 may receive the real-time video sequences and display the video sequences to a user. Alternatively, source device 12 may capture and encode video sequences that are sent to receive device 14 as video data files, i.e., not in real-time. Thus, source device 12 and receive device 14 may support applications such as video telecommunication, video clip playback, video mail, or video conferencing, e.g., in a mobile wireless network. Devices 12 and 14 may include various other elements that are not specifically illustrated in FIG. 1.

Receive device 14 may take the form of any digital video device capable of receiving and decoding video data. For example, receive device 14 may include a receiver 22 to receive encoded digital video sequences from transmitter 20, e.g., via intermediate links, routers, other network equipment, and like. Receive device 14 also may include a video decoder 24 for decoding the sequences, and a display device 26 to display the sequences to a user. In some embodiments, however, receive device 14 may not include an integrated display device 14. In such cases, receive device 14 may serve as a receiver that decodes the received video data to drive a discrete display device, such as a television or monitor.

Example devices for source device 12 and receive device 14 include servers located on a computer network, workstations or other desktop computing devices, and mobile computing devices such as laptop computers or personal digital assistants (PDAs). Other examples include digital television broadcasting satellites and receiving devices such as digital televisions, digital cameras, digital video cameras or other digital recording devices, digital video telephones such as mobile telephones or handsets having video capabilities, direct two-way communication devices with video capabilities, other wireless video devices, and the like.

In some cases, source device 12 and receive device 14 each include an encoder/decoder (CODEC) for encoding and decoding digital video data. Both source device 12 and receive device 14 may include transmitters and receivers as well as memory and displays. Many of the encoding techniques outlined below are described in the context of a digital video device that includes an encoder. It is understood, however, that the encoder may form part of a CODEC. In that case, the CODEC may be implemented within hardware, software, firmware, a DSP, a microprocessor, an application specific integrated circuit (ASIC), a field programmable gate array (FPGA), discrete hardware components, or various combinations thereof.

Video encoder 18 within source device 12 operates on blocks of pixels within a sequence of video frames in order to encode the video data. For example, video encoder 18 may execute motion estimation and motion compensation techniques, in which a video frame to be transmitted is divided into blocks of pixels (referred to as video blocks). The video blocks, for purposes of illustration, may comprise any size of blocks, and may vary within a given video sequence. As an example, the ITU H.264 standard supports 16 by 16 video blocks, 16 by 8 video blocks, 8 by 16 video blocks, 8 by 8 video blocks, 8 by 4 video blocks, 4 by 8 video blocks and 4 by 4 video blocks. The use of smaller video blocks in the video encoding can produce better resolution in the encoding, and may be specifically used for areas of video frame (regions of interest) that include higher levels of detail. Moreover, video encoder 18 may be designed to operate on 4 by 4 video blocks, and reconstruct larger video blocks from the 4 by 4 video blocks, as needed. For standards such as MPEG-4, the video blocks may comprise 16 by 16 video blocks, sometimes referred to as "macroblocks." The techniques described herein, however, are not generally limited to any size or format of the video blocks or macroblocks.

By way of example, each pixel in a video block may be represented by various n-bit values, e.g., 8 bits, that define visual characteristics of the pixel such as the color and intensity in values of chromaticity and luminosity. Each pixel may have one or more 8-bit values for both chromaticity and luminosity. Again, however, the techniques of this disclosure are not limited by the format of the pixels, and may be extended with simpler fewer-bit pixel formats or more complex larger-bit pixel formats. The pixels may also be defined in accordance with other color coordinate systems. Moreover, the video blocks may be represented by discrete cosine transform (DCT) coefficients, following a DCT of the video blocks represented by pixel values. Alternatively, the video blocks may be represented by non-zero wavelet values, following a wavelet transform of the pixel values. The rate control techniques using adaptive frame skipping, as described herein, may be applied to a wide variety of encoding standards, pixel formats, and video block sizes and shapes.

Figure 2:
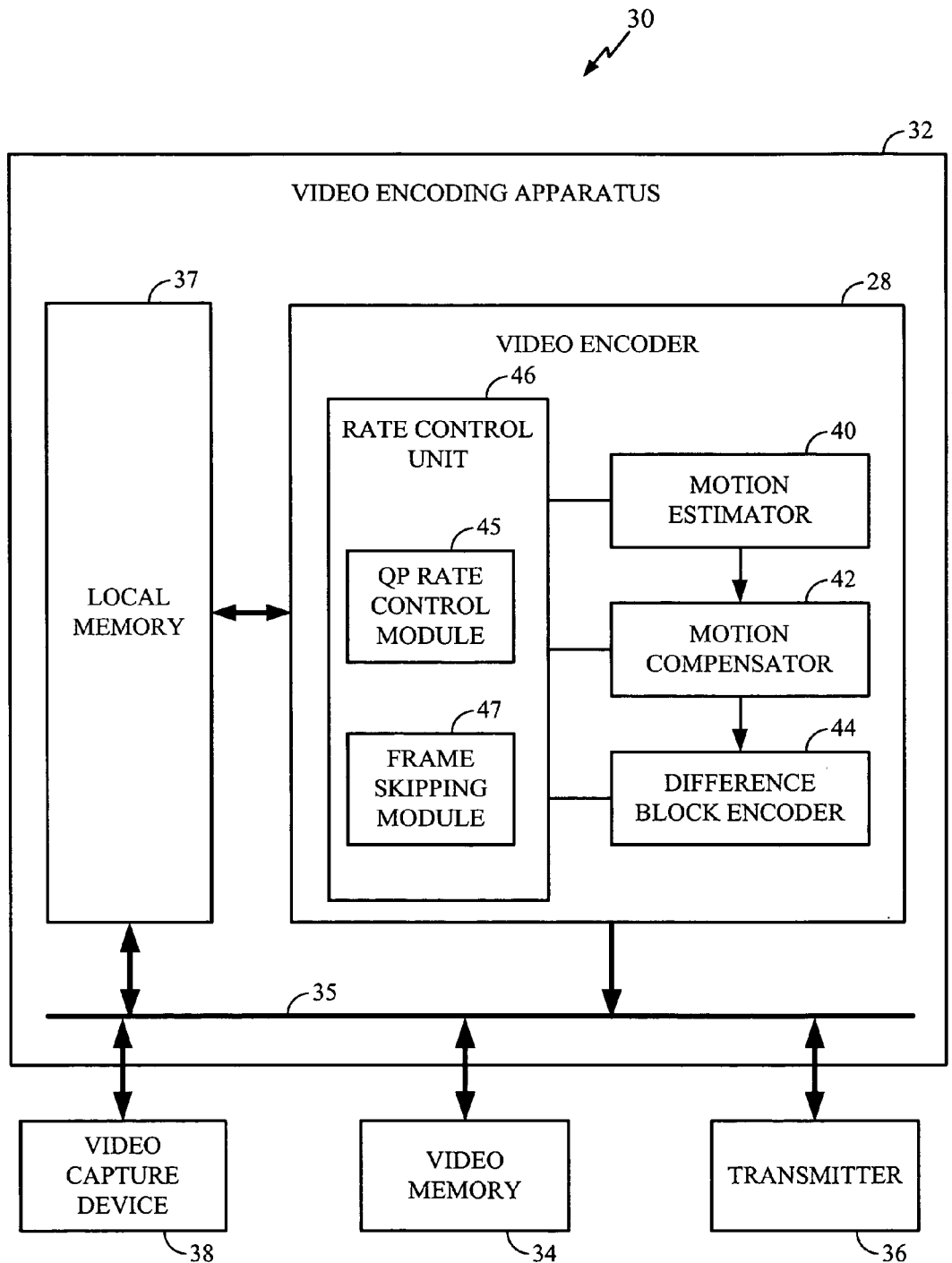
FIG. 2 is an exemplary block diagram of a video encoding device according to an embodiment of this disclosure.

FIG. 2 is an exemplary block diagram of video encoding device 30, which may correspond to source device 12. In general, device 30 comprises a digital video device capable of performing the adaptive frame skipping techniques as described herein. Device 30 may comply with a video encoding standard such as MPEG-4, ITU H.263, ITU H.264, or another video encoding standard that may benefit from the adaptive frame skipping techniques described herein.

As shown in FIG. 2, device 30 includes a video encoding apparatus 32 to encode video sequences, and a video memory 34 to store the video sequences before and after encoding. Device 30 may also include a transmitter 36 to transmit the encoded sequences to another device, and possibly a video capture device 38, such as a video camera, to capture video sequences and store the captured sequences in memory 34. The various elements of device 30 may be communicatively coupled via a communication bus 35. Various other elements, such as intra-frame encoder elements, various filters, or other elements may also be included in device 30, but are not specifically illustrated for simplicity.

Video memory 34 typically comprises a relatively large memory space. Video memory 34, for example, may comprise dynamic random access memory (DRAM), or FLASH memory. In other examples, video memory 34 may comprise a non-volatile memory or any other data storage device.

Video encoding apparatus 32 may comprise a chip set for a mobile radiotelephone, including any combination of hardware, software, firmware, and/or processors or digital signal processors (DSPs). Video encoding apparatus 32 generally includes a video encoder 28 coupled to a local memory 37. Local memory 37 may comprise a smaller and faster memory space relative to video memory 34. By way of example, local memory 37 may comprise synchronous dynamic random access memory (SDRAM). Local memory 37 may comprise "on-chip" memory integrated with the other components of video encoding apparatus 32 to allow very fast access to data during the processor-intensive encoding process. During the encoding of a given video frame, the current video block to be encoded may be loaded from video memory 34 to local memory 37. A search space used in locating the best prediction may also be loaded from video memory 34 to local memory 37. Different memories, however, are not necessary to the execution of the techniques described herein. In other words, video encoder 28 could access an on-chip or off-chip memory to obtain the video blocks and the search space.

In accordance with this disclosure, video encoder 28 includes a rate control unit 46 that executes adaptive frame skipping techniques in order to ensure that a video sequence can be effectively encoded for transmission over a limited bandwidth. In the example of FIG. 2, rate control unit includes a QP rate control module 45 to perform rate control based on the selection of quantization parameters, and a frame skipping module 47 to perform adaptive frame skipping. However, in some embodiments, the frame skipping techniques may be used alone, without dynamic rate control based on selection of QPs.

In order to encode a given video frame (i.e., a frame that is not skipped), motion estimator 40 and motion compensator 42 perform motion estimation and motion compensation, respectively, on the video frame by accessing a search space loaded into local memory 37. For example, local memory 37 may be loaded with a current video block to be encoded and a search space, which comprises some or all of one or more video frames used in inter-frame encoding. Motion estimator 40 compares the current video block to various video blocks in the search space in order to identify a best prediction. In some cases, however, an adequate match for the encoding may be identified more quickly, without specifically checking every possible candidate. In that case, the adequate match may not actually be the "best" prediction, albeit adequate for effective video encoding. In general, the phrase "prediction video block" refers to an adequate match, which may be the best prediction.

Motion estimator 40 performs the comparisons between the current video block to be encoded and the candidate video blocks in the search space of memory 37. By way of example, motion estimator 40 may perform sum of absolute difference (SAD) techniques, sum of squared difference (SSD) techniques, or other comparison techniques, in order to define the difference value for the candidate video block. A lower difference value generally indicates that a candidate video block is a better match, and thus a better candidate for use in motion estimation encoding than other candidate video blocks yielding higher difference values.

Ultimately, motion estimator 40 identifies a "best prediction," which is the candidate video block that most closely matches the video block to be encoded. However, it is understood that, in many cases, an adequate match may be located before the best prediction, and in those cases, the adequate match may be used for the encoding. Again, a prediction video block refers to an adequate match, which may be the best prediction.

Once a prediction video block is identified by motion estimator 40 for a video block to be encoded, motion compensator 42 creates a difference block indicative of the differences between the current video block and the best prediction. Difference block encoder 44 may further encode the difference block to compress the difference block, and the encoded difference block can be forwarded for transmission to another device, along a motion vector (or the difference between the motion vector and a motion vector predictor) to identify which candidate video block from the search space was used for the encoding. For simplicity, the additional components used to perform encoding after motion compensation are generalized as difference block encoder 44, as the specific components would vary depending on the specific standard being supported. In other words, difference block encoder 44 may perform a number of conventional encoding techniques on the difference block, such as 8×8 discrete cosine transform, scalar quantization, raster-to-zigzag reordering, run-length encoding, Huffman encoding, or other encoding or compression techniques.

During the encoding process, rate control can help to ensure that the number of bits used to encode a given sequence does not exceed bandwidth limitations of a communication channel associated with transmitter 36. However, as mentioned above, rate control based on QP selections alone, is not always sufficient to meet limited bandwidth requirements. In these cases, frame skipping can be applied to more adequately ensure that bandwidth requirements are met by skipping certain video frames during the video encoding. With frame skipping, the bits that would have been allocated to a skipped frame are instead recaptured for allocation to other frames in the video sequence. The adaptive frame skipping techniques, described herein, improve the quality of a video sequence relative to conventional frame skipping.

In order to perform rate control, video encoder 28 includes a rate control unit 46. Rate control unit 46 includes a QP rate control module 45 to perform rate control based on dynamic selection of QPs, and a frame skipping module 47 to perform adaptive frame skipping. In some cases, QP rate control module 45 exploits a relationship between the number of bits encoded per frame and the number of non-zero coefficients of the video blocks after quantization. The value of $\rho$, which represents the number of non-zero coefficients of the video blocks after quantization, is generally proportional to the number of bits encoded per frame (and thus the number of bits encoded per second at a constant frame rate). Accordingly, QP rate control module 45 may utilizes the relationship between $\rho$ and QP in order to achieve rate controlled video encoding.

In any case, QP rate control module 45 selects QPs that correspond to desirable rates for the video encoding. QPs may be selected on a frame by frame basis, or a video block by video block basis. This QP based rate control may form part of the encoding loop for the encoding of every video frame.

Again, QP based rate control is not always sufficient to meet limited bandwidth requirements. For this reason, rate control unit 46 also includes a frame skipping module 47. Frame skipping module 47 performs adaptive frame skipping by identifying good candidates that may be skipped. The candidates may be selected based on motion information, spatial quality, or both motion information and spatial quality. Human vision is more sensitive to temporal quality when motion is high, but human vision is more sensitive to spatial quality when motion is low. According to this disclosure, frames may be ranked based on motion activity and individually assessed based on spatial quality in order to identify the frames that can be skipped without sacrificing significant video quality.

Frame skipping module 47 may identify motion information associated with a given video frame in order to determine whether the video frame is a good candidate for skipping. For example, the motion information may comprise an average motion vector length of the video blocks that make up the candidate video frame. In this case, however, motion estimation is typically required prior to the frame skipping determination because motion estimation determines the average motion vector length. If the frame is skipped, such motion estimation computations are not used in the encoding, and are therefore wasted. For this reason, in another example, the motion information associated with a given video frame may comprise an average motion vector length associated with video blocks that make up the video frame that precedes the given video frame in the sequence. In this case, motion estimation would have already been performed with respect to the preceding video frame for the encoding, and therefore, unnecessary motion estimation with respect to a skipped frame can be avoided. The preceding frame may be immediately preceding, but the techniques are not necessary limited in this respect.

Frame skipping module 47 may rank the video frames of a video sequence based at least in part on average motion vector lengths of macroblocks of the video frames (i.e., those of the current candidate or those of a previous frame), and identify a threshold for each of the video frames based on spatial quality, as defined by quantization parameters (QPs) associated with the video frames. The threshold may be different for different video frames insofar as the QPs are different. In this manner, video frames encoded with lower QPs, which have higher spatial resolution, can be given precedence over frames that have poorer spatial resolution. By using both the ranking based on motion, and a threshold defined as a function of spatial resolution, the frame skipping module 47 can balance spatial and temporal quality of different video frames in order to identify good candidates for skipping.

Figure 3:
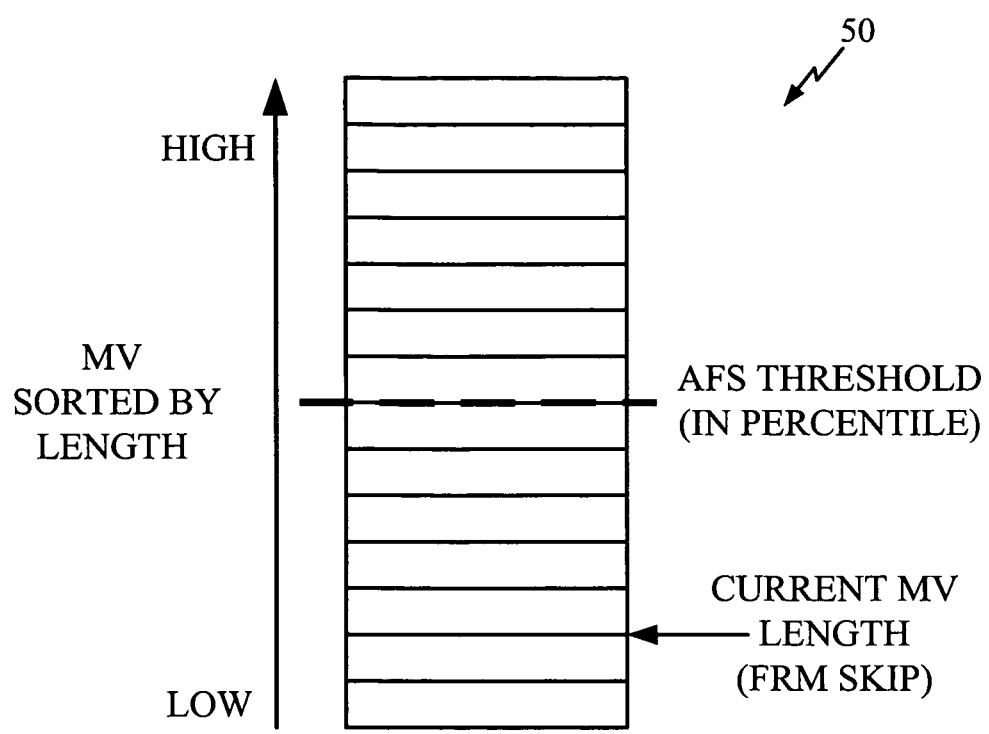
FIG. 3 is a conceptual diagram illustrating a data structure that stores a ranked set of video frames.

FIG. 3 is a conceptual diagram of a set of ranked video frames of a video sequence. Frame skipping module 47 may create such a data structure in local memory 37 in order to make the frame skipping determinations. In particular, data structure 50 includes a sequence of video frames sorted from "high" to "low." The "high" and "low" are relative quantities based on the motion vector lengths associated with the various video frames. The motion vector lengths may be the average motion vector lengths of video blocks that make up the current candidate frame or those of a frame that precedes the candidate. In this manner, data structure 50 generally ranks video frames of a video sequence based on motion activity associated with the different frames. Data structure 50 may maintain a sliding window of frames, in a ranked manner, and can discard older frames as new frames are considered and ranked.

In some cases, frame skipping module 47 may simply select the lowest candidates in data structure 50 for skipping. For example, a cut-off may be defined such that any frames having a motion vector length below the cutoff may be flagged as frame skipping candidates. The flagged frames are candidates for skipping, but are not necessarily skipped. For example, frame skipping module 47 may be configured to avoid skipping successive frames, if such frames are both very "low."

However, motion is not the only video frame characteristic that impacts desirable frame skipping determinations. For example, as mentioned above, human vision is more sensitive to temporal quality when motion is high, but human vision is more sensitive to spatial quality when motion is low. Therefore, spatial quality can also be used, in addition to motion, in order to identify candidates or exclude certain frames from skipping.

The QPs selected for frames or video blocks as part of rate control can be used to assess spatial quality of different video frames. For example, a threshold can be defined for each of the video frames based on spatial quality, as defined by quantization parameters (QPs) associated with the video frames. Lower QPs generally mean that the video frame will have higher spatial quality, since lower QPs result in more bits used in the encoding. The threshold, based on QPs, may be different for different video frames insofar as the QPs are different for different frames. The AFS ("adaptive frame skipping") threshold in FIG. 3 may be set as a percentage between the "high" and "low" ends of the motion vector length scale.

Table 1, below, provides an example of a table that can be used by frame skipping module 47 to account for spatial resolution in addition to the motion vector length of ranked video frames. The QP associated with a frame may be defined for a frame, or may be the average QP for the frame if the QP is allowed to change on a video block by video block basis. Again, lower QPs result in more spatial resolution, i.e., better quality video frames.

TABLE 1

| QP | Percentile (%) |
|---|---|
| >22 | 90 |
| 21-22 | 80 |
| 5-20 | 50 |
| <5 | 0 (no skip) |

As shown in Table 1, with respect to an MPEG-4 example, if the QP associated with a frame is greater than 22, then the percentage threshold is 90%. This means that a video frame having a QP greater than 22 can be skipped if it falls within the $90^{th}$ motion percentile as defined in data structure 50 of FIG. 3, i.e., it will be skipped unless it has a high ranking in the top 10 percent. If the QP is 21-22 then the percentage threshold is 80%, which means that the video frame can be skipped if it falls within the $80^{th}$ motion percentile. If the QP is 5-20, then the percentage threshold is 50%, which means that the video frame can be skipped if it falls within the $50^{th}$ motion percentile. For QPs less than 5, skipping may be avoided regardless of motion, as video frames having QPs less than 5 define extremely good spatial resolution. Of course, the thresholds could be defined differently, and the QPs may define higher or lower levels of resolution, depending on the standard.

Using the ranking of a frame among a series of frames according to its motion vector length, and the percentile threshold associated with the QP applied to the frame, frame skipping module 47 determines whether to skip encoding of the frame. If the motion vector length ranking of the frame is below the percentile threshold, the frame is skipped. The thresholds may also be adaptive, depending upon the available bandwidth. For example, different tables may be used as a function of available bandwidth in order to make skipping more or less likely, as needed. Importantly, by using both the ranking based on motion, and a threshold defined as a function of spatial resolution, the techniques can balance spatial and temporal quality of different video frames in order to identify good candidates for skipping.

In some cases, if a frame is skipped, the motion estimation of the following frame will be based on the frame prior to the skipped frame, which naturally leads to higher motion for any frame following a skip. Therefore, it will be very unlikely that two successive frames will be skipped. Still, frame skipping module 47 may take additional steps to avoid skipping successive frames, if desired. Also, frame skipping module 47 may define a criteria for extremely high motion, in which case, the frame skipping may be avoided at all costs. Consistent with the example of Table 1, for example, video frames having associated average motion vector lengths greater than 10 may never be skipped regardless of the QP.

In addition, frame skipping module 47 may define other tests or parameters in order to prevent frame skipping altogether when bandwidth is abundant. Moreover, in some cases, frame skipping module 47 can be programmed to take a tiered approach, in which more aggressive frame skipping or less aggressive frame skipping is performed as a function of available bandwidth. In these or other ways, frame skipping may be performed based on motion activity, spatial quality, and available bandwidth. Importantly, the ultimate skipping decision is based at least in part on motion activity, such that regardless of the aggressiveness of skipping that is applied, the frames selected as skipping candidates are those for which skipping will not overly degrade the appearance of the video sequence.

Figure 4:
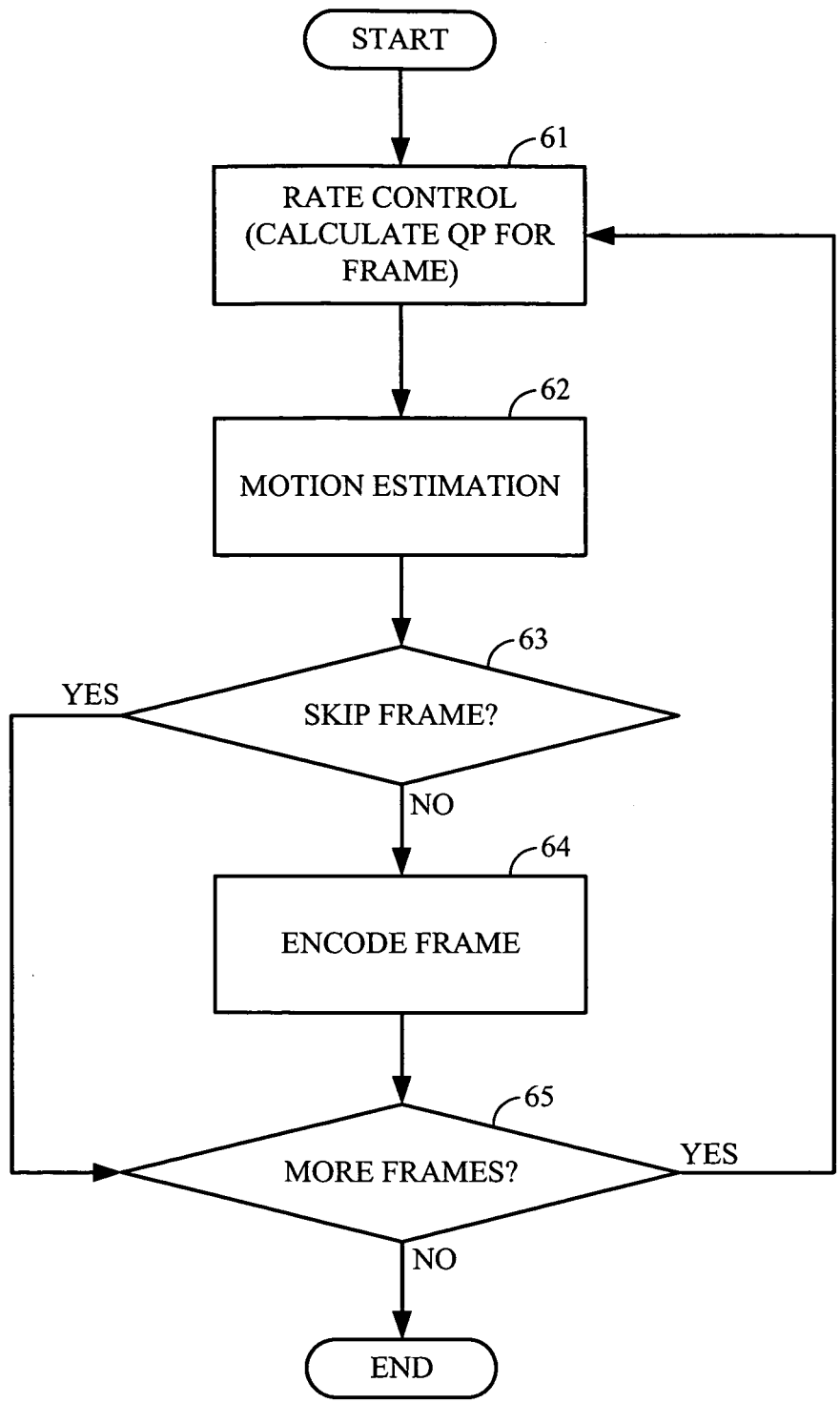
FIGS. 4-6 are flow diagrams illustrating adaptive frame skipping techniques according to embodiments of this disclosure.

FIG. 4 is a flow diagram illustrating an embodiment in which adaptive frame skipping is used in conjunction with QP based rate control. In the example of FIG. 4, the motion information used to make the frame skipping determination is the average motion vector length associated with the video frame in question. This means that motion estimation must be performed with respect to the video frame in question before the frame skipping determination can be made.

As shown in FIG. 4, QP rate control module 45 of rate control unit 46 performs rate control (61), which calculates the QP for the video frame in question. In some cases, the QP may be adjusted for different video blocks of a frame, in which case the average QP may be used in the frame skipping determination. For simplicity, however, it will be assumed that the QP is fixed for a given frame.

In some cases, module 45 may access a $\rho$-QP table from local memory 37 or may apply an equation that maps different values of $\rho$ to different QPs. In any case, once the QP has been selected, motion estimator 40 performs motion estimation for the video frame in question (62). The motion estimation generates the motion information needed to make the frame skipping determination.

Frame skipping module 47 uses the motion information and selected QP for the frame to determine whether the frame is good candidate for frame skipping. More specifically, frame skipping module may load the frame into a ranked data structure 50 that includes many other frames in the recent history of the video sequence in order to rank the current frame relative to other recent frames based on its motion. The QP can then be used to determine a percentage threshold. Frame skipping module 47 applies Table 1 in view of the ranking of the video frame within data structure 50 in order to determine whether frame skipping should occur (63). If the frame is skipped (yes branch of 63), the process repeats for the next frame in the sequence (65). If not (no branch of 63), the frame is encoded (64), e.g., by applying motion estimation and motion compensation to the frame. For more efficient implementation, the results of motion estimation performed in step 62 may be stored so that motion estimation does not need to be repeated in the encoding step 64. If the frame is skipped, however, the motion estimation performed in step 62 is not used for any encoding. The process may repeat for all the frames of a video sequence (65).

Figure 5:
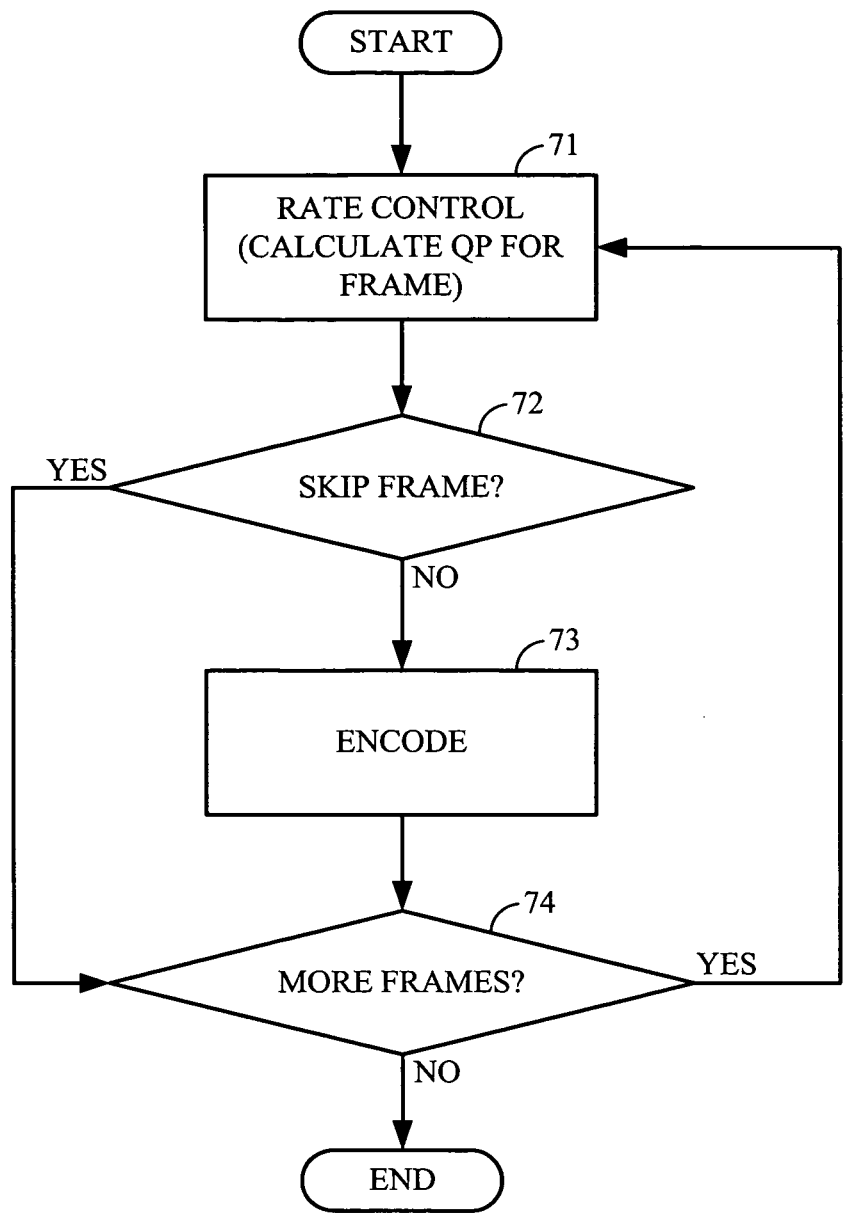

FIG. 5 is another flow diagram illustrating an embodiment in which adaptive frame skipping is used in conjunction with QP based rate control. In the example of FIG. 5, however, the motion information used to make the frame skipping determination is the average motion vector length associated with a frame that precedes the video frame in question. This means that motion estimation does not need to be performed with respect to the current video frame in question in order to make the frame skipping determination. Instead, the previous motion estimation performed during the encoding of a previous frame can define motion activity, which can be associated with a current frame as an approximation.

As shown in FIG. 5, QP rate control module 45 of rate control unit 46 performs rate control (71), which calculates the QP for the video frame in question. Again, in some cases, QP rate control module 45 may access a $\rho$-QP table from local memory 37 or may apply an equation that maps different values of $\rho$ to different QPs. Frame skipping module 47 uses motion information (in this case average motion vector length of a preceding video frame) and selected QP for the current frame to determine whether the frame is good candidate for frame skipping. Frame skipping module may load the frame into a ranked data structure 50, which includes other frames in the recent history of the video sequence. This ranks the frame with respect to the recent history of frames based on motion information associated in with the current frame. Again, in the example illustrated in FIG. 5, the motion information associated in with the current frame may be the average motion vector length of a preceding frame. In this example, the preceding frame may be immediately preceding, but the techniques are not so limited. If the preceding frame is the immediately preceding frame, following a frame skip, the same preceding frame can be used to define the motion information for the next frame (at this point, making the current frame and the preceding frame be two frames apart).

In any case, the QP can then be used to determine a percentage threshold. Frame skipping module 47 applies a percentile table, such as Table 1, in view of the ranking of the video frame within data structure 50 in order to determine whether frame skipping should occur (72). If the frame is skipped (yes branch of 72), the process repeats for the next frame in the sequence (74). If not (no branch of 72), the frame is encoded (73), e.g., by applying motion estimation and motion compensation to the frame. Notably, in FIG. 5, if the frame is skipped, motion estimation for that frame can be avoided altogether, because the motion information is derived (estimated) based on the average motion vector length of the previous frame. Once the current frame is encoded, the process may repeat for all the frames of a video sequence (74).

Figure 6:
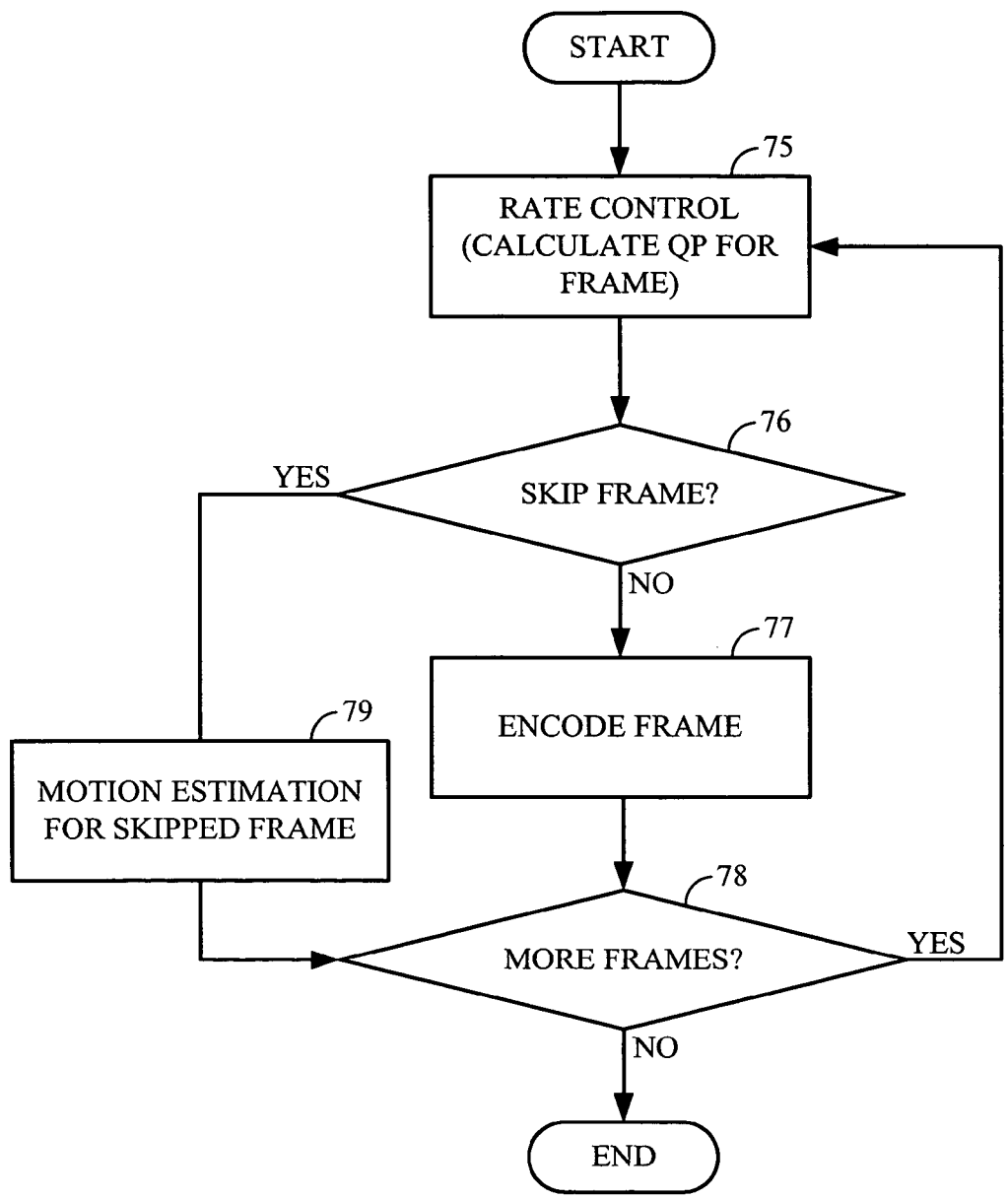

FIG. 6 is another flow diagram illustrating another embodiment in which adaptive frame skipping is used in conjunction with QP based rate control. In the example of FIG. 6, like the example of FIG. 5, the motion information used to make the frame skipping determination is the average motion vector length associated with a frame that precedes the video frame in question. However, unlike the technique of FIG. 5, in FIG. 6, when a frame is skipped, motion estimation is performed with respect to the skipped frame in order to use the motion information associated with the skipped frame to make the frame skipping determination for the next frame. In this manner, the motion information used for the frame skipping determination can always be the average motion vector length of the immediately preceding frame, even following a skip.

As shown in FIG. 6, QP rate control module 45 of rate control unit 46 performs rate control (75), which calculates the QP for the video frame in question. Frame skipping module 47 uses motion information (in this case the average motion vector length of the immediately preceding video frame) and selected QP for the current frame to determine whether the frame is good candidate for frame skipping. Frame skipping module 47 may load the frame into a ranked data structure 50, which includes other frames in the recent history of the video sequence. This ranks the frame with respect to the recent history of frames based on motion information associated in with the current frame. Again, in the example illustrated in FIG. 6, the motion information associated in with the current frame may be the average motion vector length of the immediately preceding frame.

The QP can then be used to determine a percentage threshold. Frame skipping module 47 applies a percentile table, such as Table 1, in view of the ranking of the video frame within data structure 50 in order to determine whether frame skipping should occur (76). If the frame is not skipped (no branch of 76), the frame is encoded (77), e.g., by applying motion estimation, motion compensation and other encoding techniques to the frame. Notably, in FIG. 6, if the frame is skipped, motion estimation for that frame is performed (79) in order to allow the next frame skipping determination to use the average motion vector length information of the skipped frame. If the frame is skipped, however, other encoding steps such as motion compensation, texture encoding, de-block filtering, or other encoding steps can be avoided for that frame. The process may repeat for all the frames of a video sequence (78).

Figure 7:
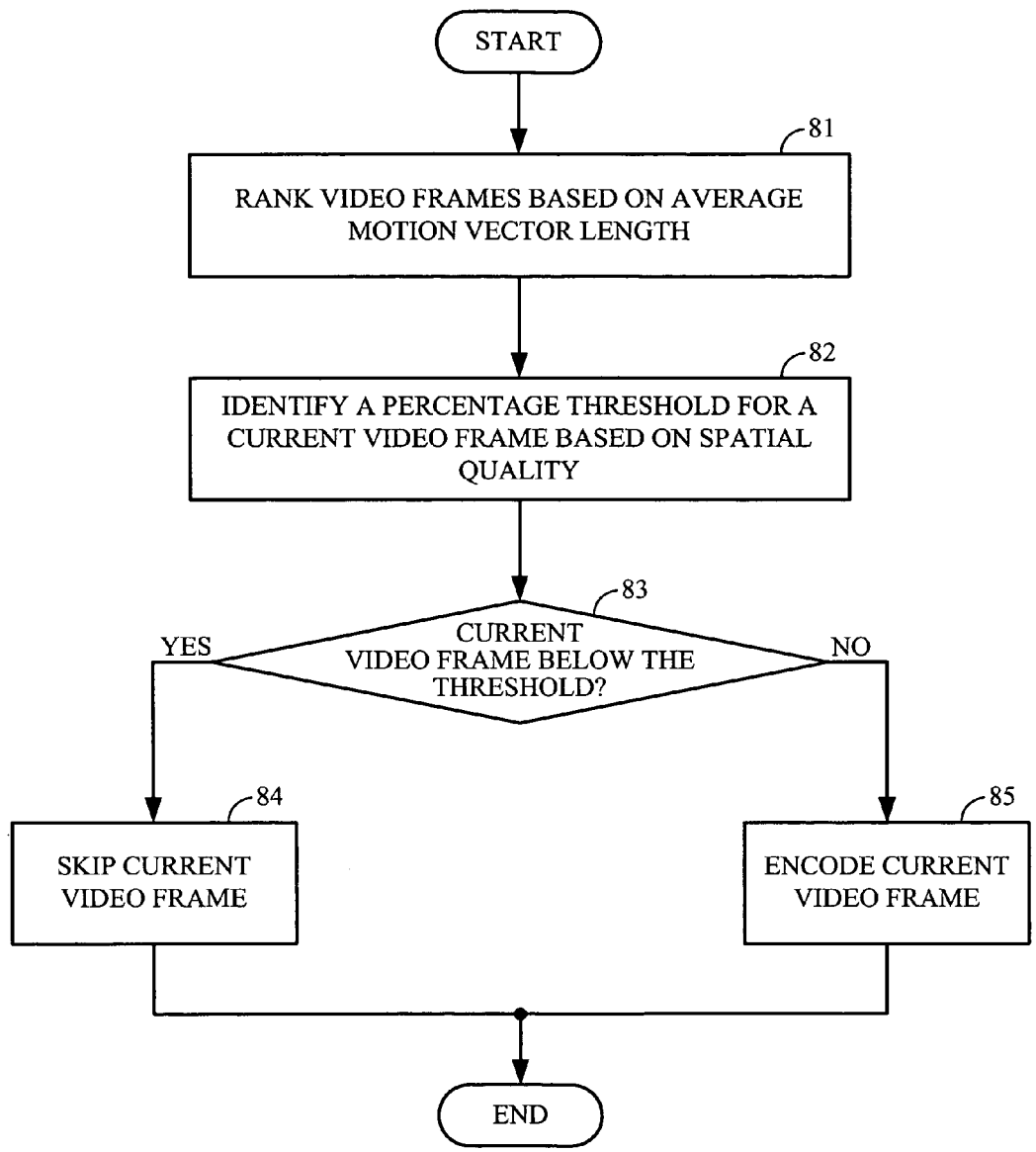
FIG. 7 is an exemplary flow diagram illustrating one technique for determining whether to skip a video frame according to an embodiment of this disclosure.

FIG. 7 is another flow diagram illustrating an exemplary technique for determining whether to skip a frame. The technique of FIG. 7, for example, may generally correspond to item 63 of FIG. 4 or item 72 of FIG. 5 or item 76 of FIG. 6. As shown in FIG. 7, frame skipping module 47 ranks video frames based on average motion vector length (either for the given frame or based on the motion vector length of the preceding frame) (81). The ranking may by stored in a table similar to Table 1 and may comprise a sliding window of ranked frames, with the oldest frames being discarded as new frames are considered and ranked.

For each given frame, rate control module 47 identifies a percentage threshold based on spatial quality (82). The QP for the frame, for example, may be used to assess the spatial quality, although other techniques for assessing spatial quality may alternatively be used. The percentage threshold defines a percentage with respect to the ranked frames. If the current frame under consideration is ranked in a percentile below the threshold (yes branch of 83), then that frame is skipped (84). However, if the current frame under consideration is ranked in a percentile above the threshold (no branch of 83), then that frame is encoded (85). The ranking accounts for temporal quality insofar as the ranking is based on motion information with the lower ranked video frames having lower motion relative to higher ranked frames. The threshold accounts for spatial quality. Moreover, since the ranking is relative to recent frames, the frame skipping decision is also a relative decision based on the temporal and spatial quality of a given frame relative the to the most recently encoded frames.

Various embodiments have been described. In particular, various rate control techniques have been proposed that make use of adaptive frame skipping. The techniques may determine when to skip a frame by examining frame motion, quantization, and available resources, in an adaptive way. The techniques can dynamically allocate an available bit budget to trade off between temporal and spatial quality. The techniques can provide excellent spatial quality when compared with techniques having no frame skipping, without compromising temporal quality. In addition, the techniques may outperform fixed frame skipping in maintaining motion smoothness and temporal quality, especially in high-motion video sequences.

The described techniques may be implemented in hardware, software, firmware, or any combination thereof. If implemented in software, the techniques may be directed to a computer readable medium comprising program code, that when executed in a device that encodes video sequences, performs one or more of the methods mentioned above. In that case, the computer readable medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, and the like.

The program code may be stored on memory in the form of computer readable instructions. In that case, a processor such as a DSP may execute instructions stored in memory in order to carry out one or more of the techniques described herein. In some cases, the techniques may be executed by a DSP that invokes various hardware components to accelerate the encoding process. In other cases, the video encoder may be implemented as a microprocessor, one or more application specific integrated circuits (ASICs), one or more field programmable gate arrays (FPGAs), or some other hardware-software combination.

Nevertheless, various modifications may be made to the techniques without departing from the spirit and scope of this disclosure. For example, other types of motion information may be used to quantify the motion associated with a video frame for purposes of video frame ranking. In addition, thresholds could be defined differently, or could be adaptive, depending upon the available bandwidth. Moreover, different thresholds could be used as a function of available bandwidth in order to make skipping more or less likely, as needed. These and other embodiments are within the scope of the following claims.

The invention claimed is:

1. A video encoding method comprising:
identifying, by a rate control unit of a video encoding device, one or more candidate video frames of a video sequence for frame skipping based at least in part on motion information associated with video frames of the video sequence, wherein identifying the one or more candidate video frames for frame skipping comprises:
ranking the video frames of the video sequence based at least in part on average motion vector lengths of video blocks of the video frames; and
for each video frame of the video sequence:
selecting a quantization parameter (QP) for the video frame;
using the QP for the video frame and an available bandwidth to determine a threshold for the video frame, wherein different thresholds are defined for at least some of the video frames; and
selecting the video frame for frame skipping based on the ranking of the video frame and the threshold for the video frame; and
skipping, by an encoder of the video encoding device, the one or more candidate video frames during encoding of the video sequence, wherein the video encoding device is implemented using a computing device.

2. The method of claim 1, wherein identifying the one or more candidate video frames for frame skipping comprises:
selecting one or more low ranked video frames as the one or more candidate video frames.

3. The method of claim 2, wherein the video blocks comprise macroblocks and the motion information comprises average motion vector lengths of the macroblocks of the video frames.

4. The method of claim 1, wherein the video blocks comprise macroblocks and identifying the one or more candidate video frames for frame skipping comprises identifying the one or more candidate video frames based at least in part on average motion vector lengths of the macroblocks associated with the one or more candidate video frames.

5. The method of claim 1, wherein the video blocks comprise macroblocks and identifying the one or more candidate video frames for frame skipping comprises identifying the one or more candidate video frames based at least in part on average motion vector lengths of the macroblocks associated with video frames that precede the one or more candidate video frames in the video sequence.

6. The method of claim 1, further comprising determining a given average motion vector length associated with each given video frame based on a preceding video frame of the video sequence.

7. The method of claim 1, further comprising determining a given average motion vector length associated with each given video frame based on the given video frame.

8. The method of claim 1, further comprising dynamically selecting the QP for the video frame to affect an encoding rate of the video encoding.

9. A video encoding device comprising:
an encoder that encodes video frames of a video sequence; and
a rate control unit that identifies one or more candidate video frames of the video sequence for frame skipping based at least in part on motion information associated with the video frames of the video sequence, and causes the encoder to skip the one or more candidate video frames during encoding of the video sequence, wherein the rate control unit identifies the one or more candidate video frames for frame skipping by:
ranking the video frames of the video sequence based at least in part on average motion vector lengths of video blocks of the video frames;
for each video frame of the video sequence:
selecting a quantization parameter (QP) for the video frame;
using the QP for the video frame and an available bandwidth to determine a threshold for the video frame, wherein different thresholds are defined for at least some of the video frames; and
selecting the video frame for frame skipping based on the ranking of the video frame and the threshold for the video frame, wherein the video encoding device is implemented using a computing device.

10. The video encoding device of claim 9, wherein the rate control unit identifies the one or more candidate video frames for frame skipping by:
selecting one or more low priority video frames as the one or more candidate video frames.

11. The video encoding device of claim 10, wherein the video blocks comprise macroblocks and the motion information comprises average motion vector lengths of the macroblocks of the video frames.

12. The video encoding device of claim 9, wherein the video blocks comprise macroblocks and the rate control unit identifies the one or more candidate video frames for frame skipping based at least in part on average motion vector lengths of the macroblocks associated with the one or more candidate video frames.

13. The video encoding device of claim 9, wherein the video blocks comprise macroblocks and the rate control unit identifies the one or more candidate video frames for frame skipping based at least in part on average motion vector lengths of the macroblocks associated with video frames that precede the one or more candidate video frames in the video sequence.

14. The video encoding device of claim 9, wherein a given average motion vector length associated with each of the video frames is determined for a given video frame based on a preceding video frame of the video sequence.

15. The video encoding device of claim 9, wherein a given average motion vector length associated with each of the video frames is determined for a given video frame based on the given video frame.

16. The video encoding device of claim 9, wherein the encoder dynamically selects the QP for the video frame to affect an encoding rate of the video encoding.

17. The video encoding device of claim 9, wherein the device comprises a telecommunication handset.

18. A non-transitory computer readable medium comprising executable instructions stored thereon that upon execution in a video encoding device cause the device to:
identify one or more candidate video frames of a video sequence for frame skipping based at least in part on motion information associated with video frames of the video sequence, wherein the instructions upon execution identify the one or more candidate video frames for frame skipping by:
ranking the video frames of the video sequence based at least in part on average motion vector lengths of video blocks of the video frames;
for each video frame of the video sequence:
selecting a quantization parameter (QP) for the video frame;
using the QP for the video frame and an available bandwidth to determine a threshold for the video frame, wherein different thresholds are defined for at least some of the video frames; and
selecting the video frame for frame skipping based on the ranking of the video frame and the threshold for the video frame; and
skip the one or more candidate video frames during encoding of the video sequence.

19. The computer readable medium of claim 18, wherein the instructions upon execution identify the one or more candidate video frames for frame skipping by:
selecting one or more low priority video frames as the one or more candidate video frames.

20. The computer readable medium of claim 19, wherein the video blocks comprise macroblocks and the motion information comprises average motion vector lengths of the macroblocks of the video frames.

21. The computer readable medium of claim 18, wherein the video blocks comprise macroblocks and the instructions upon execution, identify the one or more candidate video frames based at least in part on average motion vector lengths of the macroblocks associated with the one or more candidate video frames.

22. The computer readable medium of claim 18, wherein the video blocks comprise macroblocks and the instructions upon execution, identify the one or more candidate video frames based at least in part on average motion vector lengths of the macroblocks associated with video frames that precede the one or more candidate video frames in the video sequence.

23. The computer readable medium of claim 18, wherein a given average motion vector length associated with each of the video frames is determined for a given video frame based on a preceding video frame of the video sequence.

24. The computer readable medium of claim 18, wherein a given average motion vector length associated with each of the video frames is determined for a given video frame based on the given video frame.

25. The computer readable medium of claim 18, wherein the instructions upon execution dynamically select the QP for the video frame to affect an encoding rate of the video encoding.

26. A method comprising:
generating, by a motion estimator of a video encoding device, motion vector length values for video frames in a video sequence;
ranking, by a rate control unit of the video encoding device, the video frames based at least in part on average motion vector length values of the video frames;
for each video frame in the video sequence:
selecting a quantization parameter (QP) for the video frame;
using, by the rate control unit of the video encoding device, the QP for the video frame and an available bandwidth to determine a ranking percentile threshold for the video frame, wherein different thresholds are defined for at least some of the video frames; and skipping, by an encoder of the video encoding device, encoding of the video frame if the video frame is ranked below the ranking percentile threshold for the video frame, wherein the video encoding device is implemented using a computing device.

\* \* \* \* \*